United States Patent
Sabater et al.

(10) Patent No.: US 12,387,418 B2
(45) Date of Patent: Aug. 12, 2025

(54) METHOD AND APPARATUS FOR GENERATING ADAPTIVE MULTIPLANE IMAGES

(71) Applicant: InterDigital CE Patent Holdings, SAS, Paris (FR)

(72) Inventors: Neus Sabater, Betton (FR); Julia Navarro, Palma (ES); Julien Fleureau, Rennes (FR); Bertrand Chupeau, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 241 days.

(21) Appl. No.: 18/272,446

(22) PCT Filed: Jan. 11, 2022

(86) PCT No.: PCT/EP2022/050468
§ 371 (c)(1),
(2) Date: Jul. 14, 2023

(87) PCT Pub. No.: WO2022/152708
PCT Pub. Date: Jul. 21, 2022

(65) Prior Publication Data
US 2024/0185507 A1    Jun. 6, 2024

(30) Foreign Application Priority Data

Jan. 14, 2021   (EP) .................................. 21305039

(51) Int. Cl.
*G06T 15/08*    (2011.01)
*G06T 15/50*    (2011.01)

(52) U.S. Cl.
CPC ............ *G06T 15/08* (2013.01); *G06T 15/503* (2013.01)

(58) Field of Classification Search
None
See application file for complete search history.

(56) References Cited

U.S. PATENT DOCUMENTS

| | | | |
|---|---|---|---|
| 2018/0373009 A1* | 12/2018 | Yuste | G02B 21/06 |
| 2020/0226816 A1* | 7/2020 | Kar | G06T 7/50 |
| 2024/0223767 A1* | 7/2024 | Yang | G06T 15/00 |

(Continued)

OTHER PUBLICATIONS

Zhou et al., "Stereo Magnification: Learning View Synthesis using Multiplane Images", Association for Computing Machinery, ACM Transactions on Graphics, vol. 37, Issue 4, Article 65, Aug. 2018, 12 pages.

(Continued)

*Primary Examiner* — Nurun Flora
(74) *Attorney, Agent, or Firm* — Volpe Koenig

(57) ABSTRACT

Methods and devices for generating a multiplane image from a representation of a 3D scene are disclosed. Given a representation of the 3D scene, for example as a multiview image, a first MPI is generated by a convolutional neural network trained for generating a MPI according to a provided sampling of the depths of the 3D scene. The presence of objects in different layers, that is the complementary of the accumulated transparency of layers, is analyzed to resample the sampling of layers' depth. The new sampling is used by the CNN to generate a new MPI from a representation of the same 3D scene.

14 Claims, 2 Drawing Sheets

(56) References Cited

U.S. PATENT DOCUMENTS

2025/0056043 A1* 2/2025 Oh .................. H04N 21/85406

OTHER PUBLICATIONS

Volker et al., "Learning Light Field Synthesis with Multi-Plane Images: Scene Encoding as a Recurrent Segmentation Task", Institute of Electrical and Electronics Engineers (IEEE), 2020 IEEE International Conference on Image Processing (ICIP), Abu Dhabi, United Arab Emirates, Oct. 25, 2020, 5 pages.

Navarro et al., "Compact and Adaptive Multiplane Images for View Synthesis", Cornell University Library, Computer Science, Computer Vision and Pattern Recognition, Document: arXiv:2012.10086v1, Feb. 19, 2021, 5 pages.

Chen, Yen-Lin, "A knowledge-based approach for Textual Information Extraction from Mixed Text/Graphics Complex Document Images", Institute of Electrical and Electronics Engineers (IEEE), 2010 IEEE International Conference on Systems, Man and Cybernetics, Istanbul, Turkey, Oct. 10, 2010, 8 pages.

* cited by examiner

METHOD AND APPARATUS FOR GENERATING ADAPTIVE MULTIPLANE IMAGES

CROSS REFERENCE TO RELATED APPLICATIONS

Please add the following as the first and second paragraphs of the application:

This application is a U.S. National Stage Application under 35 U.S.C. § 371 of International Patent Application No. PCT/EP2022/050468, filed Jan. 11, 2022, which is incorporated herein by reference in its entirety.

This application claims priority to European Application No. 21305039.6, filed Jan. 14, 2021, which is incorporated herein by reference in its entirety.

1. TECHNICAL FIELD

The present principles generally relate to the domain of three-dimensional (3D) scene and volumetric video content. The present document is also understood in the context of the encoding, the formatting, and the decoding of data representative of the texture and the geometry of a 3D scene for a rendering of volumetric content on end-user devices such as mobile devices or Head-Mounted Displays (HMD). The present principles particularly relate to the generating of volumetric scenes as a multiplane image.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

A multiplane image (MPI) is a layered representation of a volumetric scene where each layer is a slice of the 3D space of the scene. Each slice is sampled according to an underlying central projection (e.g. perspective, spherical, . . . ) and a sampling law which defines the interlayer spacing. A layer is an image that comprises color as well as transparency information of any 3D intersecting object of the scene. From this sliced representation, it is possible to recover/synthesize any viewpoint located in a limited region around the center of the underlying projection. It can be performed making use of efficient algorithms (e.g. "reversed" Painter's algorithm) which blend each layer with the proper weights (i.e. transparency) starting from the nearest to the furthest layer. Such techniques may run very faster than other known view synthesis processes.

The memory footprint of an MPI is directly related to the size of the images (W×H pixels), multiplied by the number D of depth layers, and multiplied by 4 channels (e.g. RGBA). This memory footprint may be a drawback for some applications if it is uncontrolled. Given a memory footprint, the way the layers of an MPI are organized (i.e. their respective depths) directly influence the quality of the rendering. Mechanisms to actively generate MPIs of a controlled memory footprint, adapting the depth of layers for a given 3D scene are missing for overcoming the memory footprint bottleneck.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate a method for generating a multiplane image comprising n layers, a layer having a transparency channel. The method comprises:
  obtaining data representative of a 3D scene and a list of n depth values;
  generating a first multiplane image by inputting the data in a convolutional neural network trained to generate multiplane images with n layers at depths following the list of n depth values;
  resampling the list of depth values as a function of a sum of values of the transparency channel of the layers of the first multiplane image; and
  generating the multiplane image by inputting the data in the convolutional neural network using the resampled list of n depth values.

In a particular embodiment, resampling the list of depth values comprises:
  discarding depth values corresponding to layers having a sum of their transparency channel values lower than a first value; and
  inserting depth values in the list as a function of an inverse of a depth distance between successive non-discarded depth values to replace discarded depth values.

In another embodiment, inserting depth values in the list is performed as a function of an inverse of a depth distance between successive non-discarded depth values weighted by a value determined as a function of the sum the transparency channel values of layers corresponding to non-discarded depth values. In a variant, The data representative of a 3D scene are provided as a multiview image and wherein inserting depth values in the list is performed as a function of an inverse of a depth distance between non-discarded depth values weighted by a value determined according to an error between views of the multiview image and corresponding views synthesized by using the first multiplane image. The generating of the multiplane image and/or the resampling of the list of depth values may be iterated.

In a particular configuration, the method further comprises encoding the generated multiplane image.

The present principles also relate to a device comprising a memory associated with a processor configured to implement the method above.

4. BRIEF DESCRIPTION OF DRAWINGS

The present disclosure will be better understood, and other specific features and advantages will emerge upon reading the following description, the description making reference to the annexed drawings wherein:

FIG. 1 shows a representation of a multiplane image, according to a non-limiting embodiment of the present principles;

FIG. 2 diagrammatically illustrates an example architecture of the encoding, transmission and decoding of data representative of a 3D scene;

5. DETAILED DESCRIPTION OF EMBODIMENTS

Figure 1:
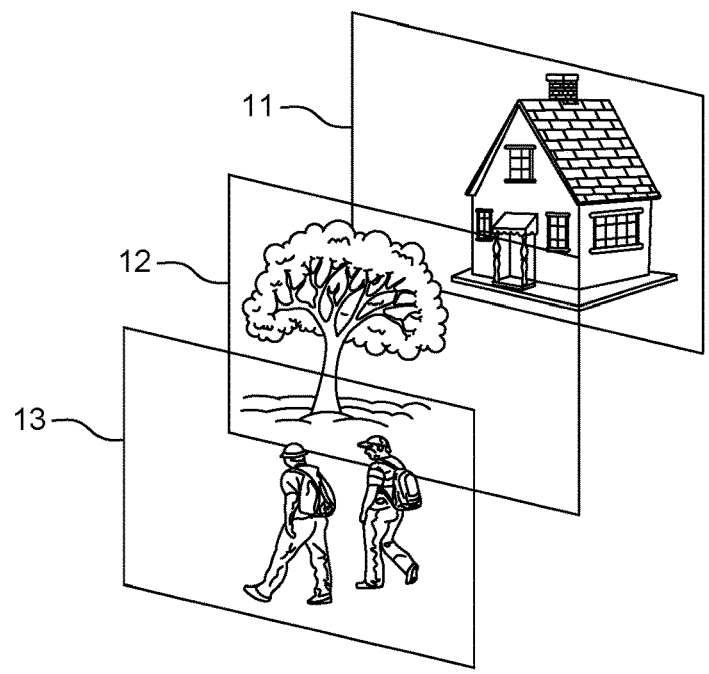

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

In the literature, the MPI planes are equally spaced according to inverse depth in a fixed depth range, which is globally selected to be coherent with the whole dataset. However, both the depth range and the regular sampling may not be optimal for every scene, so the resulting MPIs may have empty depth slices. These planes occupy memory while not being meaningful for the scene that is represented. According to the present principles, the depth sampling is adapted to the given scene by redistributing these empty slices and placing them at more relevant depths. Consequently, scene objects are encoded on layers located at more accurate depths, leading to synthesized views with higher quality.

Different representations formats for volumetric data have been proposed. Lately MultiPlane Images (MPI) has been used as an efficient representation format in the deep learning literature. Given a number of input views, for instance as a multiview image or in the form of Plane Sweep Volumes, the network learns how to fill the volume defined by the MPI. An MPI is defined before the network is trained given the number of depth planes D, and the minimum and maximum depth values. The depth planes are spaced with a regular sampling in 1/z. So, regardless of the captured scene, the MPI volume (the container) does not change, only the values (the content) of each voxel are learnt. The more planes (also called layers), the better the recovered images (i.e. synthesized views). But the amount of needed GPU memory when training such networks is a technical problem when the number D of layers is large. So, deep learning methods reduce the size of the input images (i.e. resolution), so the memory footprint decreases. The volume can also be downsampled in depth, producing a reasonable volume of data. While this trick allows to show the interest of the approach, it is a drawback for many applications and is the current bottleneck of the technology. The present principles propose to adapt the sampling of the MPI with respect to the geometry of the scene. The present principles estimate the container and the content and not only the content.

FIG. 1 shows a representation of a multiplane image. In the example of FIG. 1, the MPI is composed of three layers 11, 12 and 13 from the background to the foreground according to a perspective center of projection. The number of layers and the part of the volumetric scene projected onto each layer may vary. For instance, the two characters of layer 13 may be represented on two separate layers (e.g. if or when one of them partially masks the other one). The distance between each layer may also vary to be representative of the difference of depth (i.e. distance to the center of projection) of objects represented onto two consecutive layers. The type of projection may differ too. For instance, a panoramic MPI would be represented as concentric cylinders. A 360° MPI would be represented as concentric spheres or cubes, for example.

From this sliced representation, it is possible to synthesize any viewpoint located in a limited region around the center of the underlying projection. It can be done making use of efficient alpha compositing algorithms which blend each layer with the proper weights (transparency) starting from the nearest to the furthest. According to the location of the viewpoint, occultations of objects of the background by objects of the foreground may differ, allowing an observer to experience a parallax effect and to perceive the volume of the scene by lightly moving his head.

Figure 2:
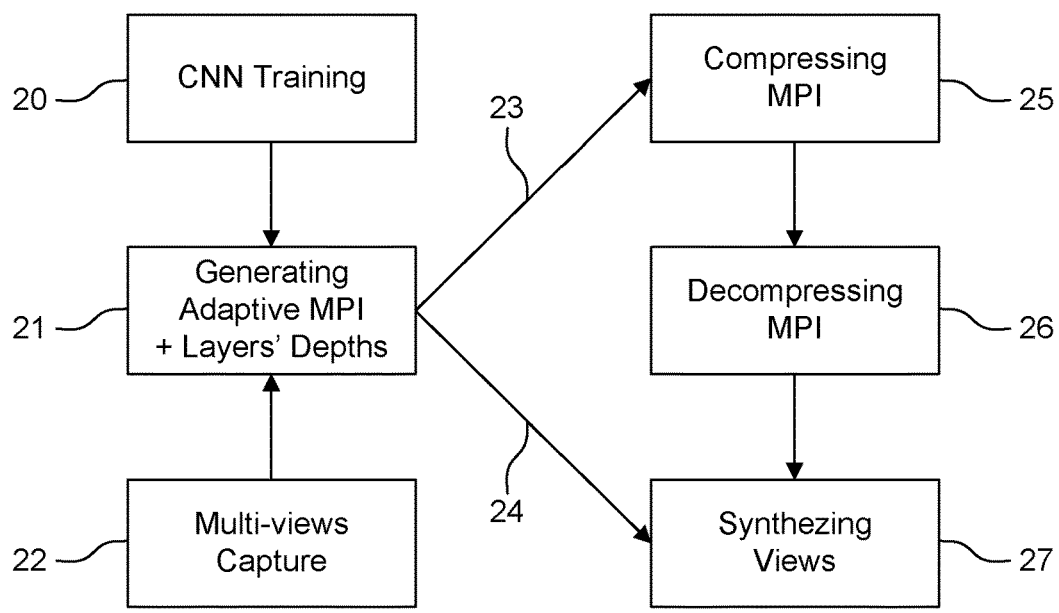

FIG. 2 diagrammatically illustrates an example architecture of the encoding, transmission and decoding of data representative of a 3D scene. A module 20 trains a convolutional neural network (CNN) to generate an MPI of a given memory footprint and a sampling of the layers' depth from a representation of a 3D scene, for instance as a multiview image or as a plane sweep volume (PSV). The trained parameters are used to instantiate a CNN 21 for creating adaptive MPIs for which the depth sampling is not defined per se as a regular sampling in 1/z in a given depth range but is computed depending on the scene geometry. Thus, given an allowed memory footprint (i.e. given the image resolution and a number of layers), the resulting MPI optimizes the corresponding volume to capture at best the texture and geometry of the scene. Indeed, when the layers of the MPI are located where the objects of the scene are, the view is better recovered with less blur when synthesized. At the inference phase, a 3D scene is captured by an acquisition system 22 and provided to CNN 21 that output an MPI 23 and a sampling 24 of the layers' depth. MPI 23 is encoded, for example compressed, by a module 25. The encoded MPI is transmitted to a rendering client which first decode (e.g. decompress) the data stream in a module 26. The renderer synthesizes viewport images according to a pose of a virtual camera by using the decoded MPI and the sampling 24 of the layers' depth.

Figure 3:
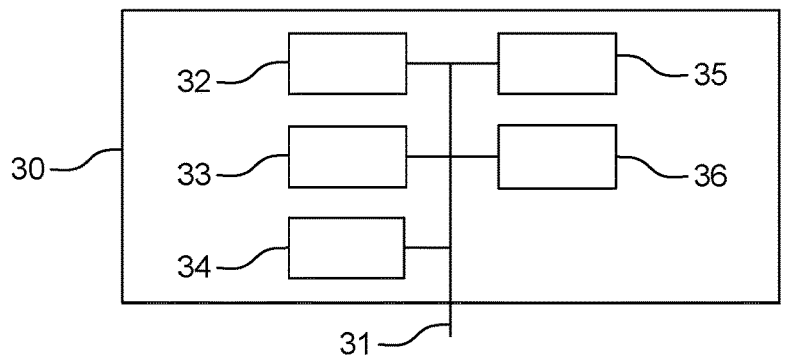
FIG. 3 shows an example architecture of a device 30 which may be configured to implement a method described in relation with FIG. 4.
Figure 4:
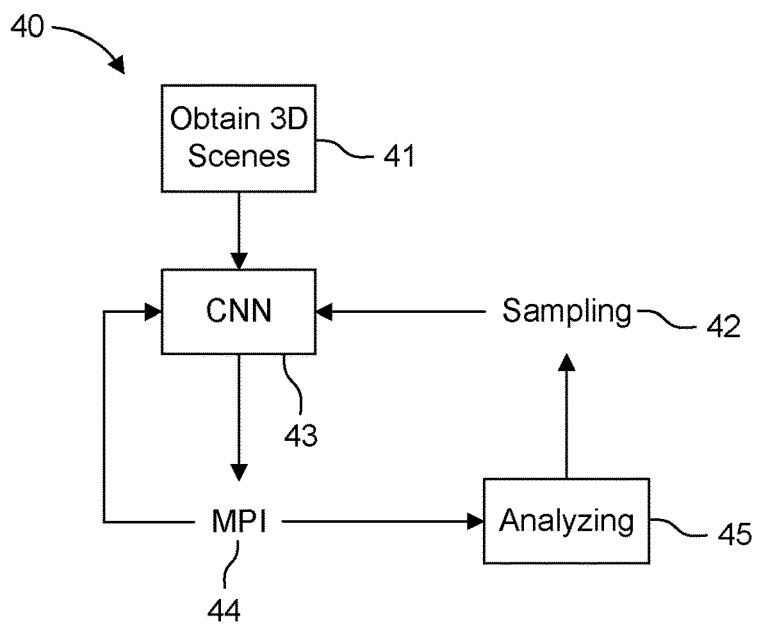
FIG. 4 illustrates an iterative method 40 for generating an MPI with a sampling of depth layers adapted to the geometry of the encoded 3D scene.

FIG. 3 shows an example architecture of a device 30 which may be configured to implement a method described in relation with FIG. 4. Alternatively, each circuit (e.g. first and/or second CNN) of FIG. 4 may be a device according to the architecture of FIG. 3, linked together, for instance, via their bus 31 and/or via I/O interface 36.

Device 30 comprises following elements that are linked together by a data and address bus 31:
- a microprocessor 32 (or CPU), which is, for example, a DSP (or Digital Signal Processor);
- a ROM (or Read Only Memory) 33;
- a RAM (or Random Access Memory) 34;
- a storage interface 35;
- an I/O interface 36 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with examples, the device 30 is configured to implement a method described in relation with 9, and belongs to a set comprising:
- a mobile device;
- a communication device;
- a game device;
- a tablet (or tablet computer);
- a laptop;
- a still picture camera rig;
- a video camera;
- an encoding chip;
- a server (e.g. a broadcast server, a video-on-demand server or a web server).

FIG. 4 illustrates an iterative method 40 for generating an MPI with a sampling of depth layers adapted to the geometry of the encoded 3D scene. At a step 41, data representative of the 3D scene to encode are obtained, for example from an acquisition system or from a memory. The data may be represented as a multiview image or as PSV, for example. A sampling 42 of layers' depth is obtained. For a first iteration, an initial sampling may be $d^0=[1/z_1, \ldots, 1/z_D]$; where $z_1=z_{max}, \ldots, z_D=z_{min}$ are regularly spaced. At a step 43, the data and sampling 42 are inputted in a convolutional neural network (CNN) trained to generate a MPI from data representative of a 3D scene according to a provided sampling 42 of layers' depth. An MPI 44 is generated. In practice, the CNN may output a residual part of an MPI that is iteratively added to the MPI under construction which is iteratively inputted in the CNN. At a step 45, MPI 44 is analyzed to compute a new sampling 42 based on the scene geometry. Indeed, the first iteration is used to create a coarse MPI $M_1(d^0)$ where the scene geometry is estimated. It allows to roughly know where the objects and the empty regions are placed in the scene. Hence, the space is resampled to place the D depth planes (i.e. layers) where the objects are. It would be a waste of memory to keep layers in the empty spaces. In this manner, with the new adaptive depth sampling $d=[d_1, \ldots, d_D]$ a new MPI volume is defined. Other iterations of step 43 allow to fill the new adapted volume.

Step 45 may be performed only once or iterated. However, the redefinition of sampling 42 may require the acquisition of new data representative of the same 3D scene, for instance to adapt these data to the new sampling. In this case, step 41 is iterated.

Figure 5:
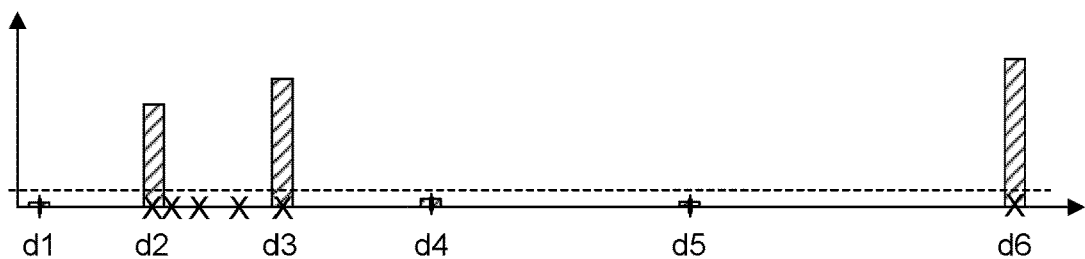
FIG. 5 illustrates an exemplary graphic representing the accumulated alpha value for a layer i at a sampling depth di as a possible output of the step 45.

FIG. 5 illustrates an exemplary graphic representing the accumulated alpha value for a layer i at a sampling depth di as a possible output of the step 45. On the example of FIG. 5, a first sampling d={d1, d2, d3, d4, d5, d6} is represented for depths between 1 meter and 2 meters. With a regular sampling in 1/z, d={1/1, 1/0.9, 1/0.8, 1/0.7, 1/0.6, 1/0.5}.

In a first embodiment, the adaptive depth sampling is computed by a dedicated CNN that takes as input the alpha channel of the MPI sampled according to an input sampling and outputs an updated sampling of depths. Both input and updated sampling contain the same number of items. In a second embodiment, the updated sampling of depths is calculated by removing depth corresponding to empty layers and by resampling the regions where the objects are placed (i.e. between the filled layers). Considering the alpha channel of the MPI, an accumulated alpha value is computed for each layer I according to equation Eq. 1, for example.

$$\bar{\alpha}_i = \frac{1}{x \cdot y} \sum_{x,y} \alpha_i(x, y) \qquad \text{Eq. 1}$$

The accumulated alpha value of a layer i indicates a level of the significance of the i-th layer. High values of $\bar{\alpha}_i$ mean that several objects are located at depth di and small values mean that there is an empty space in the scene at depth di. On FIG. 5, the vertical axis represents the accumulated alpha of layers located at a depth on horizontal axis. When $\bar{\alpha}_i$ is smaller than a given level δ (the dotted line in FIG. 5), the i-th layer is removed from the list of layers.

The last depth plane, d6 in the present example, always contains important information. Also, the choice of the level is important because many MPI layers contain spurious pixels in the image borders which are not essential for the final image recovery. In real examples, the remaining depth layers is a more complicated list of non-consecutive values compared to the example in FIG. 5. For example, considering a larger list with D=32, after removing the depth layers with $\bar{\alpha}_i \leq \delta$, the list of depths corresponding to the objects can be $\{d_3\} \cup [d_9, d_{18}] \cup [d_{23}, d_{27}] \cup \{d_{32}\}$. In this case the $3^{rd}$ and $32^{nd}$ depths will remain in the new sampling list, and the remaining 30 layers are redefined inside the ranges $[d_9, d_{18}]$ and $[d_{23}, d_{27}]$. For example, each of the two ranges are resampled according to their density (i.e. the number of filled layers they comprise), that is ⅔ for $[d_9, d_{18}]$ (i.e. 20 of the 30 layers) and ⅓ for $[d_{23}, d_{27}]$ (i.e. 10 of the 30 layers).

The resampling rule of the remaining depth ranges can be done in different ways:

In a first variant, this resampling is performed following a distribution in 1/z as the initial depth sampling but in the given range. In the example of FIGS. 5, d2, d3 and d6 are kept and the 3 removed depths are resampled following 1/z between d2 and d3. The new values are represented by an X on FIG. 5.

In a second variant, as higher values of $\bar{\alpha}_i$ mean that more objects are placed at depth i, a finer sampling is performed around such depth. For example, the new depths in a range $1/z_j$, $1/z_k$ planes are placed at $$\frac{1}{w \cdot z_j + (1-w) \cdot z_k}$$

where w are weights taking into account the values $\bar{a}_j$ and $\bar{a}_k$.

In a third variant of the second embodiment, the new list of depths is based on the reconstruction error of the analyzed MPI: In this case, new views are synthesized thanks to the MPI and compared with real captures. This allows to generate an error map e(x, y) that measures how well the views are recovered from the MPI. If a given pixel (x, y), in the same reference system than the MPI, has very large errors (i.e. greater than a threshold), a finer sampling is performed around the objects seen at pixel (x, y). Indeed, errors may be caused by a too coarse depth sampling of the MPI. In the third variant, the depth resampling is performed for the whole scene and not per pixel. So, connected regions in which the error e(x, y) is too high are considered and the sampling is readapted so more depth places are placed around the objects seen in such regions.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for generating a multiplane image comprising n layers, a layer having a transparency channel, the method comprising:
   obtaining data representative of a 3D scene and a list of n depth values;
   generating a first multiplane image by inputting the data in a convolutional neural network trained to generate multiplane images with n layers at depths following the list of n depth values;
   resampling the list of n depth values as a function of a sum of values of the transparency channel of the layers of the first multiplane image; and
   generating the multiplane image by inputting the data in the convolutional neural network using the resampled list of n depth values.

2. The method of claim 1, wherein resampling the list of n depth values comprises:
   discarding depth values corresponding to layers having a sum of values of their transparency channel lower than a first value; and
   inserting depth values in the list as a function of an inverse of a depth distance between successive non-discarded depth values to replace discarded depth values.

3. The method of claim 2, wherein inserting depth values in the list is performed as a function of an inverse of a depth distance between successive non-discarded depth values weighted by a second value determined as a function of the sum of values of the transparency channel of layers corresponding to non-discarded depth values.

4. The method of claim 2, wherein the data representative of a 3D scene are provided as a multi-view image and wherein inserting depth values in the list is performed as a function of an inverse of a depth distance between non-discarded depth values weighted by a third value determined according to an error between views of the multi-view image and corresponding views synthesized by using the first multiplane image.

5. The method of claim 1, wherein the generating of the multiplane image is iterated.

6. The method of claim 1, wherein the resampling of the list of depth values is iterated.

7. The method of claim 1, further comprising encoding the generated multiplane image.

8. A device for generating a multiplane image comprising n layers, a layer having a transparency channel, the device comprising a memory associated with a processor configured for:
   obtaining data representative of a 3D scene and a list of n depth values;
   generating a first multiplane image by inputting the data in a convolutional neural network trained to generate multiplane images with n layers at depths following the list of n depth values;
   resampling the list of n depth values as a function of a sum of values of the transparency channel of the layers of the first multiplane image; and
   generating the multiplane image by inputting the data in the convolutional neural network using the resampled list of n depth values.

9. The device of claim 8, wherein resampling the list of n depth values comprises:
   discarding depth values corresponding to layers having a sum of values of their transparency channel lower than a first value; and
   inserting depth values in the list as a function of an inverse of a depth distance between successive non-discarded depth values to replace discarded depth values.

10. The device of claim 9, wherein inserting depth values in the list is performed as a function of an inverse of a depth distance between successive non-discarded depth values weighted by a second value determined as a function of the sum of values of the transparency channel of layers corresponding to non-discarded depth values.

11. The device of claim 9, wherein the data representative of a 3D scene are provided as a multi-view image and wherein inserting depth values in the list is performed as a function of an inverse of a depth distance between non-discarded depth values weighted by a third value determined according to an error between views of the multi-view image and corresponding views synthesized by using the first multiplane image.

12. The device of claim 8, wherein the generating of the multiplane image is iterated.

13. The device of claim 8, wherein the resampling of the list of depth values is iterated.

14. The device of claim 8, the processor is further configured for encoding the generated multiplane image.

* * * * *